United States Patent [19]
Hausberg et al.

[11] 3,791,108
[45] Feb. 12, 1974

[54] FLOW-ACCELERATING NOZZLE FOR GAS SCRUBBER

[75] Inventors: Gerhard Hausberg; Karl-Rudolf Hegemann, both of Essen-Bergerhausen, Germany

[73] Assignee: Gottfried Bischoff Bau Kompl Gosreinigungs und Wasseruckkuhlanlagen KG, Essen, Germany

[22] Filed: Mar. 16, 1972

[21] Appl. No.: 235,149

Related U.S. Application Data

[63] Continuation-in-part of Ser. No. 188,557, Oct. 13, 1971, Pat. No. 3,726,065.

[30] Foreign Application Priority Data
Oct. 10, 1970 Germany.............................. 2049902
Dec. 2, 1970 Germany.......................... 20592000

[52] U.S. Cl...................... 55/226, 55/238, 55/258, 55/260, 55/270, 55/315, 55/441, 55/457, 55/DIG. 14, 261/76, 261/115, 261/DIG. 54
[51] Int. Cl............................................ B01d 47/10
[58] Field of Search ..... 55/223, 226, 238, 258, 260, 55/270, 315, 441, 457, 237, DIG. 14, 257, 456; 261/76, 115, 116, 117, 118, DIG. 54

[56] References Cited
UNITED STATES PATENTS

| | | | |
|---|---|---|---|
| 665,224 | 1/1901 | Johannis.............................. | 261/76 |
| 1,494,917 | 5/1924 | Kirgan ................................. | 261/76 |
| 2,484,277 | 10/1949 | Fisher ......................... | 261/DIG. 54 |
| 2,709,577 | 5/1955 | Pohndorf et al......................... | 261/2 |
| 3,116,348 | 12/1963 | Walker .............................. | 261/62 X |
| 3,140,163 | 7/1964 | Hausberg............................. | 55/257 |
| 3,199,267 | 8/1965 | Hausberg........................ | 261/109 X |

*Primary Examiner*—Dennis E. Talbert, Jr.
*Attorney, Agent, or Firm*—Karl F. Ross; Herbert Dubno

[57] ABSTRACT

A washer for the scrubbing of flue gases contains one or more flow-accelerating nozzles with generally pear-shaped inserts vertically displaceable in a tubular housing to vary the width of an annular gap formed between the insert and the housing to give passage to a descending gas stream. The lower part of the housing is flared outwardly and provided with several spacedly nested, similarly flared sleeves forming therewith a plurality of annular exit channels around a central port accommodating a stem which supports the insert.

6 Claims, 3 Drawing Figures

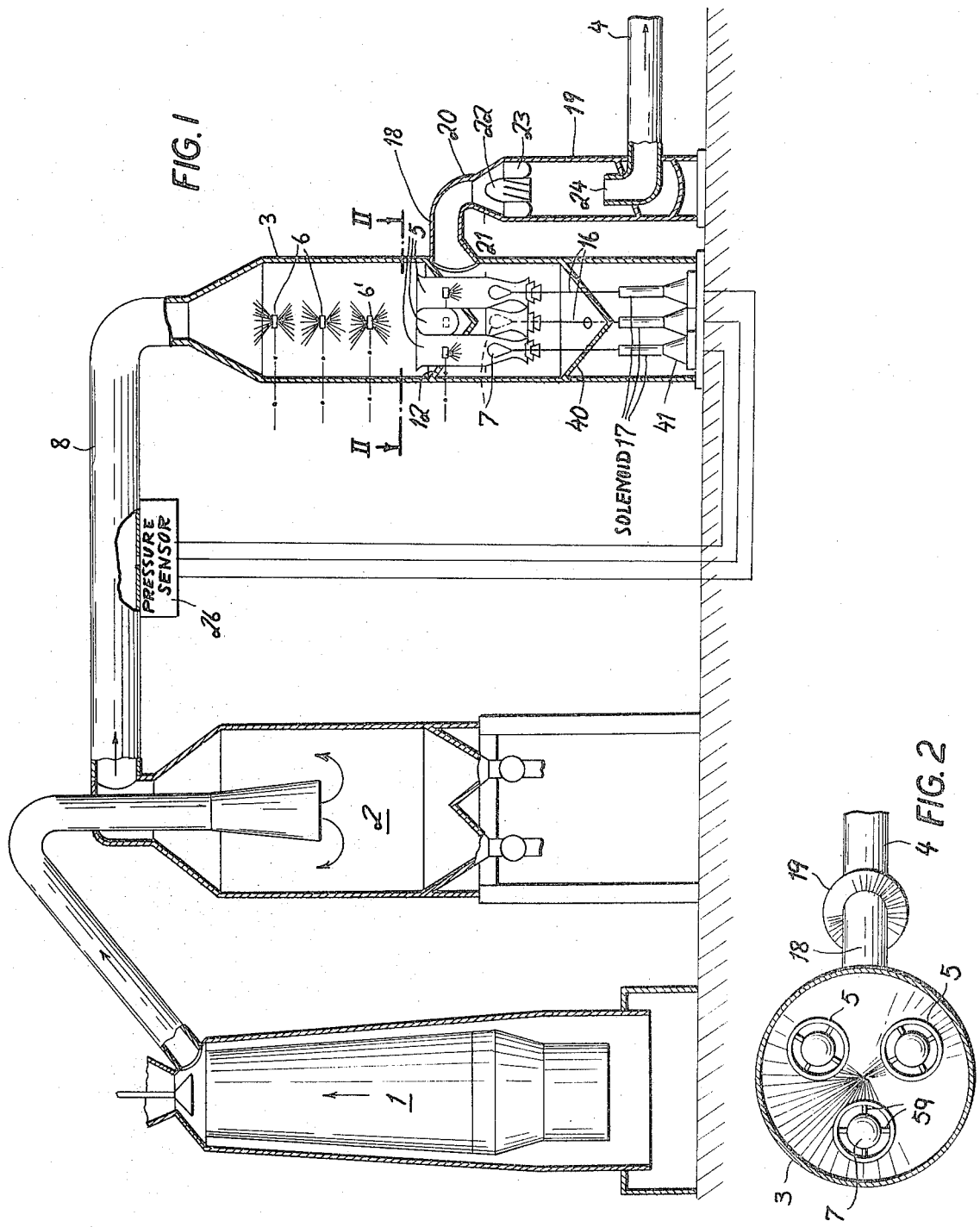

FLOW-ACCELERATING NOZZLE FOR GAS SCRUBBER

This application is a continuation-in-part of our co-pending application Ser. No. 188,557 filed 12 Oct. 1971 now U.S. Pat. No. 3,726,065.

Our present invention relates to an apparatus for scrubbing high-pressure waste gases, such as those of a Bessemer converter, before releasing them into the atmosphere.

In commonly owned U.S. Pat. Nos. 3,140,163 and 3,199,267 (Hausberg), systems for scrubbing or cleaning waste gases have been disclosed wherein the gases are conducted through a wash tower having an upstream compartment with several spray heads, this compartment being separated from a downstream compartment by a transverse partition traversed by one or more nozzles which form throttled passages for the wetted gases. These passages are generally in the form of annular gaps defined by the nozzles and by respective inserts of smaller diameter received therein as disclosed in the later Hausberg patent. Each insert coacts with a constricted waist portion of the associated nozzle whereby an adjustment of the gap width is possible upon relative axial movement of the two bodies. Such adjustment, as likewise taught in that second patent, may be used to maintain a substantially constant pressure differential across the gap.

In flowing through the annular gap, the wetted and particle-laden gases are accelerated so as to develop a certain turbulence resulting in intimate mixing of the two phases. Upon entering the downstream compartment, the gases expand with resulting precipitation of their moisture on the entrained solids which are thereby washed from the gas stream, e.g., with the aid of a baffle-type water separator near the outlet of the tower.

In our above-identified copending application, we have disclosed an apparatus of this type wherein the washed gases, after passing from the upper compartment into the lower compartment through one or more nozzles mounted in the intervening partition, are discharged from the wash tower through an exit port opening into a generally horizontal outlet duct just below the partition, the lower end of the nozzle or nozzles lying below the level of that port so that the gas issuing from each nozzle must reverse its flow direction within the lower compartment. As a result, droplets of water precipitated on entrained solids are removed from the gas stream on account of their greater inertia and continue downwardly into a collection trough.

The general object of our present invention is to provide an improved nozzle construction for this purpose in which the exiting gas is positively guided along part of its reversing flow so as to reduce turbulence and increase the operating efficiency of the tower.

A more particular object is to provide means in such a nozzle for stratifying the issuing gas flow to achieve a still higher efficiency.

These objects are realized, pursuant to our present invention, by the provision of a tubular nozzle body terminating at its lower end in an outwardly flared skirt and defining an annular channel with a downwardly diverging sleeve substantially paralleling that skirt, this channel opening laterally outwardly toward the periphery of the lower tower compartment.

In a preferred embodiment, the outlet end of the nozzle includes a plurality of such diverging sleeves spacedly nested in the skirt of the nozzle housing to form several parallel annular channels.

The sleeve or sleeves surround, preferably with clearance, a stem which extends axially downward from the nozzle body and supports its tapering insert. This stem may be raised and lowered, together with the insert, by means of a solenoid or the like to vary the width of the annular gap between the insert and the constricted nozzle waist in response to a pressure sensor communicating with either or both compartments, as more fully described in our above-identified copending application. Thus a portion of the gas stream (generally the one most heavily laden with wetted particles) will descend directly along that stem toward the bottom of the tower and will only then change direction to join the generally radial flow exiting from the laterally extending channel or channels.

The sleeve or sleeves may be fixedly mounted on the nozzle housing but could also be carried on the stem of the generally pear-shaped insert, especially if the mobility of the latter is limited to a minor fraction of the channel width.

The above and other features of our invention will be described in detail hereinafter with reference to the accompanying drawing in which:

FIG. 1 is a schematic sectional elevation of an apparatus embodying our invention;

FIG. 2 is a cross-sectional view taken on the line II — II of FIG. 1, drawn to a larger scale.

Figure 3:
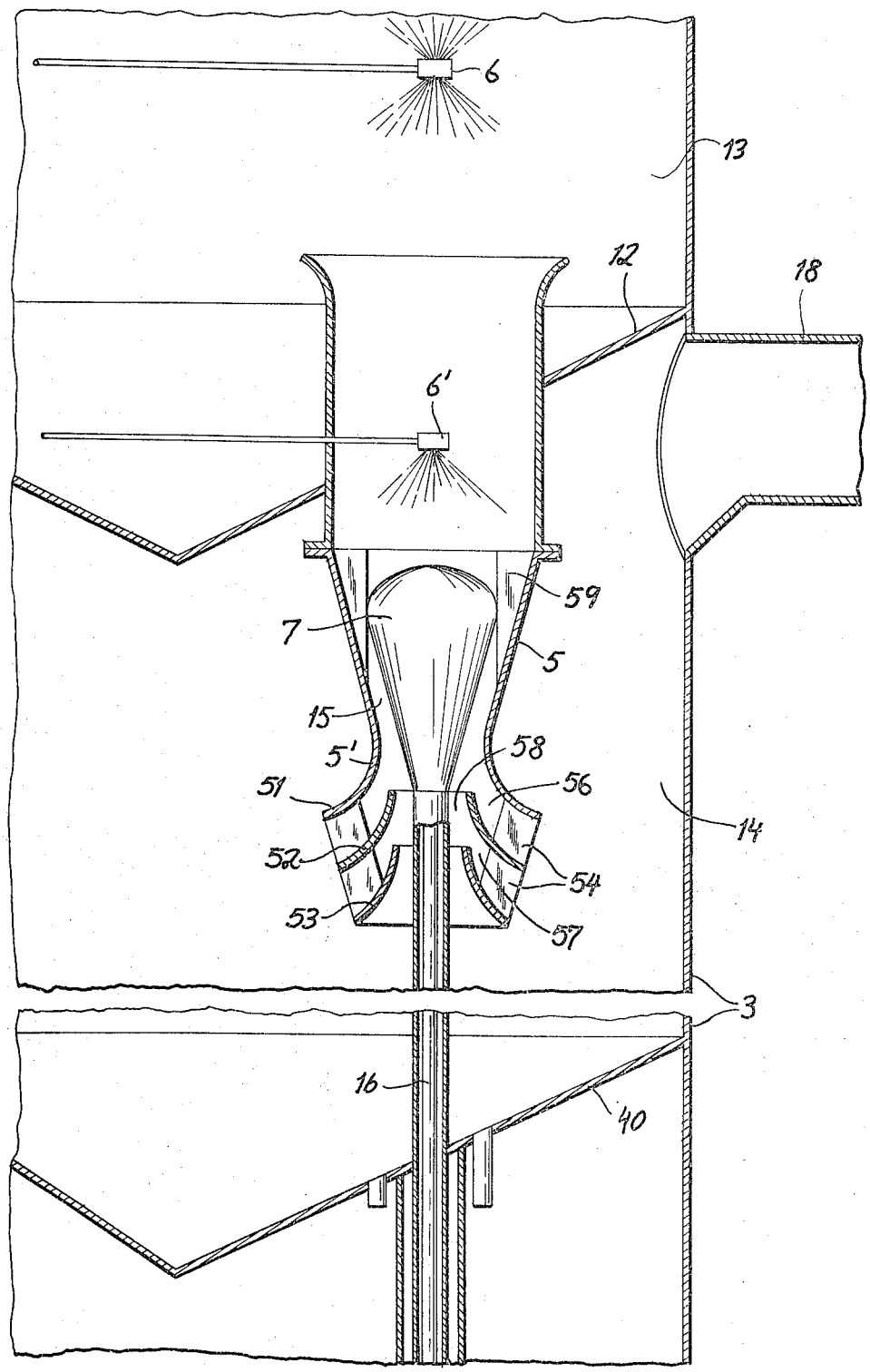
FIG. 3 is an enlarged detail view, in sectional elevation, of a nozzle forming part of the apparatus of FIGS. 1 and 2.

In FIGS. 1 and 2 we have shown a system for the scrubbing of flue gases coming from a high-pressure blast furnace 1, the gases being subjected to coarse cleaning in a dustbin 2 before entering an inlet duct 8 which terminates at a wash tower 3.

A conical partition 12 with downwardly pointing apex divides the interior of the tower into an upstream compartment 13 and a downstream compartment 14; it should be noted that, contrary to the arrangement disclosed in the two above-identified Hausberg patents, the gases to be scrubbed enter the towers at the top and traverse them in a downward direction. Partition 12 carries a triangular array of three nozzles 5, each nozzle having a constricted waist portion 5' (see FIG. 3) coacting with an accelerating insert 7 of downwardly tapering shape to define an annular gap 15 whose width can be varied by vertically shifting the insert 7; for this purpose, the insert is mounted on a stem 16 which is rigid with the core of a controlling solenoid 17. Several spray heads 6, stacked in compartment 13 along the tower axis in line with the vertical axis of the nozzle array, serve to wet the incoming gases on their descent into compartment 14 through the throttled passages 15. This compartment opens into a horizontal outlet duct 18 leading to a water separator 19. As described in greater detail in our copending application Ser. No. 188,558, filed 5 Oct. 1970, separator 19 has a downwardly open entrance port 20 merging into a frustoconical neck 21 which surrounds a generally projectile-shaped deflector 22 centered on the axis thereof, the deflector being held in position by a set of peripheral vanes 23 which are inclined to impart a swirling motion to a gas stream descending through a narrow annular channel defined by the deflector and the cylinder 19. Water entrained by this air stream precipitates on the cylinder wall as the gas expands on leaving the channel, the water then running down to a non-illustrated collector while the gas is discharged through an upwardly open central exit port 24 into an exhaust 4.

It will be noted that the outlet 18 is disposed beneath partition 12 above the level of the lower ends of nozzles 5, thereby forcing the gases issuing from these nozzles to change direction on their way to the water separator 19. As a result, droplets of water precipitated on entrained solids are removed from the gas stream on account of their greater inertia and continue downwardly into a collection trough shown at 40, thereby enabling a smaller dimensioning of the separator 19 than would otherwise be necessary.

The input pressure prevailing in duct 8 and manifold 9 is ascertained by a pressure sensor 26 generating an output signal proportional to that pressure, this signal being delivered to a set of controllers (not shown) for the three solenoids 17 associated with the nozzles 5 of tower 3; these controllers are located in housings 41. The stems 16 of the corresponding nozzle cores or inserts 7 may carry lugs each coacting with a pair of fixed stops, as more fully described in application Ser. No. 188,557, for the purpose of limiting its vertical displacement to a range within which the pressure differential within the gap 15 varies linearly with the output of sensor 26.

Two other sensors, not shown, monitor the pressure in upper and lower compartments 13 and 14 to detect the magnitude of this pressure differential. If the input pressure in duct 8 fails to reach a predetermined level, e. g., on start-up of the blast furnace 1, sensor 26 may establish a reduced differential as compared with normal operation. In the absence of any input pressure, i. e., on standstill of the plant, the inserts 7 can be lowered sufficiently to block the passage through nozzles 5.

As best illustrated in FIG. 3, the lower part of each nozzle 5 is shaped into an outwardly flared skirt 51 adjoining the waist portion 5'. Two similarly flared sleeves 52 and 53, of generally frustoconical shape, are suspended from skirt 51 by narrow radial ribs 54 to define a pair of annular channels 56, 57 along with a central passage 58 surrounding the stem 16 with clearance. Naturally, the number of channels illustrated can be increased or reduced.

Thus, the moisture-laden gases traversing the cap 15 are split into several layers exiting from the nozzle in a generally radial direction via channels 56 and 57 as well as downwardly by way of passage 58. All these strata are forced to make a sharp upward turn in order to reach the exit port leading to duct 18, thereby shedding the entrained dust particles and droplets. A substantial portion of this accompanying matter will drop directly onto the conical trough 40 near the bottom of the tower in which the stems 16 are guided; a nonillustrated drain pipe may extend outwardly from the apex of the cone.

Internal ribs 59 in the upper part of the nozzle help guide the insert 7 along its vertical path. These ribs 59 may be aligned with respective ribs 54 and are advantageously of the same width.

We claim:

1. In an apparatus for cleaning high-pressure waste gases, including a wash tower with partition means dividing same into an upstream compartment and a downstream compartment, inlet means for waste gases communicating with said upstream compartment, spray means in said upstream compartment and outlet means for washed gas communicating with said downstream compartment, the combination therewith of at least one flow-accelerating nozzle in said partition means forming a passage for said washed gas, said nozzle comprising:

a tubular body centered on a substantially vertical axis, said body traversing said partition means and terminating in an open upper end and an open lower end on opposite sides of said partition means, said ends being separated by a constricted portion of said body;

a downwardly tapering insert received with clearance in said body and defining an annular gap with said constricted portion, said body forming an outwardly flared skirt at said lower end beneath said gap; and a downwardly diverging sleeve in said lower end substantially paralleling said skirt and defining therewith an annular channel opening laterally outwardly toward the periphery of said lower compartment.

2. The combination defined in claim 1 wherein said lower compartment is provided with an exit port leading to said outlet means from a location near said partition means, said annular channel opening into said lower compartment below the level of said exit port.

3. The combination defined in claim 1, further comprising a second sleeve in said lower end substantially paralleling the first-mentioned sleeve and defining therewith another annular channel.

4. The combination defined in claim 3 wherein said sleeves have aligned central apertures for the downward passage of part of said washed gas.

5. The combination defined in claim 4 wherein said insert is provided with a downwardly extending stem passing with clearance through said central apertures.

6. The combination defined in claim 5 wherein said stem is provided with control means for raising and lowering said insert to vary the width of said annular gap.

* * * * *